June 22, 1965  H. P. KOPPEHELE  3,189,929
WIPING DEVICE FOR CONTINUOUS TRAVELING FILMS
Filed Dec. 22, 1961

3,189,929
WIPING DEVICE FOR CONTINUOUS
TRAVELING FILMS
Hugo P. Koppehele, Glen Riddle, Pa., assignor to Avisun Corporation, Philadelphia, Pa., a corporation of Delaware
Filed Dec. 22, 1961, Ser. No. 161,534
1 Claim. (Cl. 15—308)

The present invention relates to a wiping device, and more particularly to an apparatus for removing liquids from traveling continuous films, webs, and like articles.

In the manufacture of continuous films by methods involving a series of sequential stages, it is often necessary that liquids which have been applied to or condensed on the film during one stage be substantially or completely removed before such film is passed through a subsequent treating stage. In the production of polypropylene film, for example, a molten polymer is extruded through a nozzle as a continuous shaped stream and then quenched within a bath of water or other liquid. Generally, the quenched film is then oriented by stretching while it is continuously advanced, with heat being applied to the film during and/or prior to the actual stretching operation.

The presence of droplets of water or other liquid on the film prevents uniform heating of the same so that the stretching operation is achieved only with great difficulty and is often interrupted as the film tends to split under the applied tensions. Furthermore, the resulting film is of poor quality, generally being marked with numerous round spots having high haze values. While various devices have been tried to eliminate this problem, none has proven to be entirely satisfactory. Accordingly, a primary object of this invention is to provide a new or improved and generally more satisfactory wiping device for traveling continuous length materials.

Another object is the provision of a wiping device for traveling continuous films which includes a pair of absorbent members which engage with and wipe liquids from the opposite sides of the film and suction means for removing the liquid absorbed by the wiping members.

Figure 1:
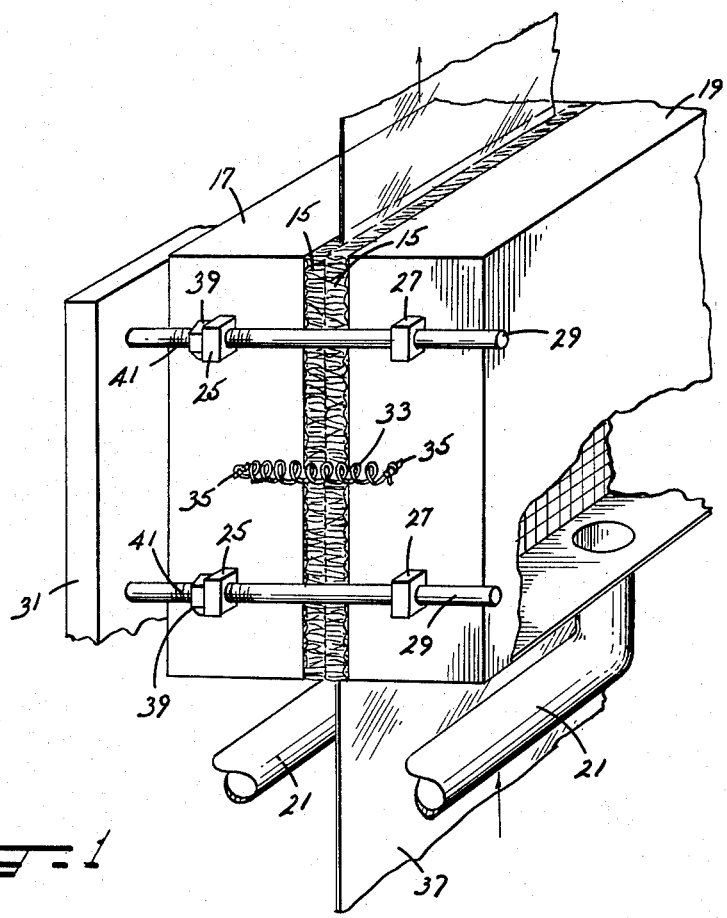
Figure 2:
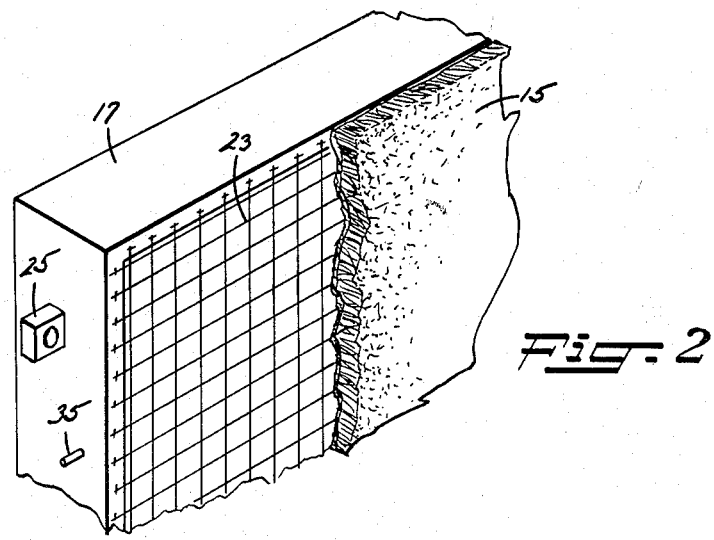

These and other objects and advantages of the invention will be apparent from the following description and accompanying drawing in which:

FIGURE 1 is a perspective view of the apparatus of the present invention with portions thereof being broken away; and FIGURE 2 is a perspective view of a portion of the apparatus shown in FIGURE 1.

In general, the apparatus of the present invention includes a pair of spaced absorbent members which are adapted to wipe the opposite surfaces of a film free of liquids as it travels therebetween. The wiping members form the opposing walls of a pair of chambers which are kept evacuated for continuously and rapidly removing liquids absorbed by the wiping members. To insure good wiping action and yet allow film portions of different thicknesses to pass freely therebetween, the wiping members are formed of soft, flexible and absorbent material, as for example terry cloth. Preferably, the opposing suction chambers are movably mounted to facilitate adjustment and easier film lacing operations.

With reference to the drawing, the apparatus of the present invention includes a pair of spaced absorbent wiping members 15 which form the opposing walls of chambers 17 and 19, conduits 21 connected to a suitable vacuum source, not shown, for maintaining the chambers evacuated, and wire screens 23 which support the members 15 against collapse into the chambers under the applied suction. Blocks 25 and 27 are fixed to opposite sides of the chambers 17 and 19 and are slidably supported on rods 29 which project from a suitable supporting structure, as shown at 31. A pair of springs 33 are engaged over pins 35 at opposite sides of the chambers for urging and maintaining the absorbent members 15 in snug engagement with the surface of the continuous article to be wiped, as for example a continuous film as shown at 37. Nuts 39 are adjustable relative to threaded portions 41 of the rods 29 and serve as stops for maintaining the chamber 17 in a desired fixed position relative to the path of the film 37 during wiping operations.

As heretofore mentioned, the wiping members 15 are formed of a soft, flexible and absorbent material, as for example terry cloth or other similar pile fabrics, which provided for good wiping action, notwithstanding irregularities or thickness variations along the film.

In using the above described apparatus, for example in wiping of a continuous polypropylene film as it is removed from a quenching bath, the film 37 is initially laced along a desired path after which the stop nuts 39 are adjusted so that the absorbent member 15 of the chamber 17 is positioned in snug wiping engagement with the adjacent surface of the film 37. The chamber 19 is then moved along the rods 29 until its absorbent member 15 is engaged with the opposite surface of the film. The chambers 17 and 19 are then connected to each other by springs 33. Air is evacuated from within the chambers 17 and 19 through the conduits 21 by means of a high volume fan, preferably one which can provide a vacuum equal to at least 15 inches of water.

As the film 37 is continuously advanced in the direction indicated by arrows in FIGURE 1, droplets of water or other liquids carried on the surfaces of the film are absorbed by the wiping members 15. Under the evacuated conditions which exist within the chambers 17 and 19, absorbed liquids are rapidly removed from the wiping members 15 and discharged through the conduits 21. The absorbent capacity of the wiping members 15 thus remains substantially uniform regardless of the amount of liquid carried by the film or the duration of the wiping operation.

It will be noted that the screens 23 support the wiping members 15 snugly against the film 37 notwithstanding the evacuated conditions which exist within the chambers 17 and 19. Further, in view of the soft and flexible character of the material forming the wiping members 15, irregularities in the film can pass freely between such members without interrupting wiping operations or damaging the film. When unusually large variations in the thickness of the film are encountered, the chamber 19 will automatically adjust itself against the resilient action of the springs 33.

It is to be understood that changes and variations may be made without departing from the spirit and scope of the invention as defined in the appended claims.

I claim:

Apparatus for removing liquids from traveling continuous films including a pair of chambers each having an open side, a screen extended across each of the open sides of said chambers, a wiping cloth formed of a soft, flexible and absorbent material disposed over each of said screens, means for moving a continuous film relative to said wiping cloths, said wiping cloths being disposed in opposing relationship and adapted to engage with and to wipe liquids from adjacent surfaces of the film as it travels therebetween, spring means joining the respective chambers to effect snug engagement of said wiping cloths against the opposite sides of a continuous film as it is moved therebetween, and suction means including a conduit for maintaining the chambers evacuated and for removing liquids absorbed by said wiping cloths.

References Cited by the Examiner
UNITED STATES PATENTS

| | | | |
|---|---|---|---|
| 1,687,283 | 10/28 | Deutscher | 15—320 |
| 2,134,806 | 11/38 | Shough | 34—95 |
| 2,303,124 | 11/42 | Johannessen | 34—71 |
| 2,395,397 | 2/46 | Croft | 15—308 |
| 2,648,089 | 8/53 | Mayer | 15—306.1 |
| 2,674,112 | 4/54 | Jones | 34—71 |

NORMAN YUDKOFF, *Primary Examiner.*